United States Patent [19]

Kato

[11] Patent Number: 5,050,082

[45] Date of Patent: Sep. 17, 1991

[54] SYSTEM FOR CONTROLLING AUTOMOTIVE AUTOMATIC TRANSMISSION

[75] Inventor: Yuji Kato, Tokyo, Japan

[73] Assignee: Nissan Motor Co., Ltd., Japan

[21] Appl. No.: 279,690

[22] Filed: Dec. 5, 1988

[30] Foreign Application Priority Data

Dec. 7, 1987 [JP] Japan .................................. 62-308948

[51] Int. Cl.⁵ ........................ G05D 17/02; G06F 15/50
[52] U.S. Cl. ................................ 364/431.01; 74/866;
364/424.1
[58] Field of Search ........................ 364/131, 133, 424.1,
364/431.1; 74/861, 866, 867, 868, 869, 856;
123/425, 421, 435

[56] References Cited

U.S. PATENT DOCUMENTS

| | | | |
|---|---|---|---|
| 4,513,717 | 4/1985 | Kobayashi | 123/425 |
| 4,528,955 | 7/1985 | Sugiura | 123/425 |
| 4,556,955 | 12/1985 | Wright et al. | 364/133 |
| 4,619,236 | 10/1986 | Okada et al. | 123/435 |
| 4,630,584 | 12/1986 | Higashiyama et al. | 123/425 |
| 4,677,878 | 7/1987 | Yamamori et al. | 74/861 |
| 4,685,356 | 8/1987 | Iwatsuki | 74/866 |
| 4,819,187 | 4/1989 | Yasue et al | 364/424.1 |
| 4,825,372 | 4/1989 | Yasue et al. | 364/424.1 |
| 4,843,916 | 7/1989 | Bouta | 74/861 |

FOREIGN PATENT DOCUMENTS

| | | |
|---|---|---|
| 3514056 | 10/1985 | Fed. Rep. of Germany . |
| 58-143169 | of 0000 | Japan . |
| 60-245866 | of 0000 | Japan . |
| 62-251553 | 11/1987 | Japan . |
| 2154765 | 9/1985 | United Kingdom . |

Primary Examiner—Felix D. Gruber
Attorney, Agent, or Firm—Lowe, Price, LeBlanc & Becker

[57] ABSTRACT

There is disclosed a system for controlling an automatic transmission with which an automotive engine is incorporated. The system comprises a first control unit which controls an ignition timing of the engine in accordance with an octane value of gasoline on which the engine is operated; a second control unit which controls a gear change point of the transmission and controls a line pressure of the transmission in accordance with a given factor of the fuel; and a correcting unit which corrects the line pressure in accordance with the octane value of the gasoline.

11 Claims, 6 Drawing Sheets

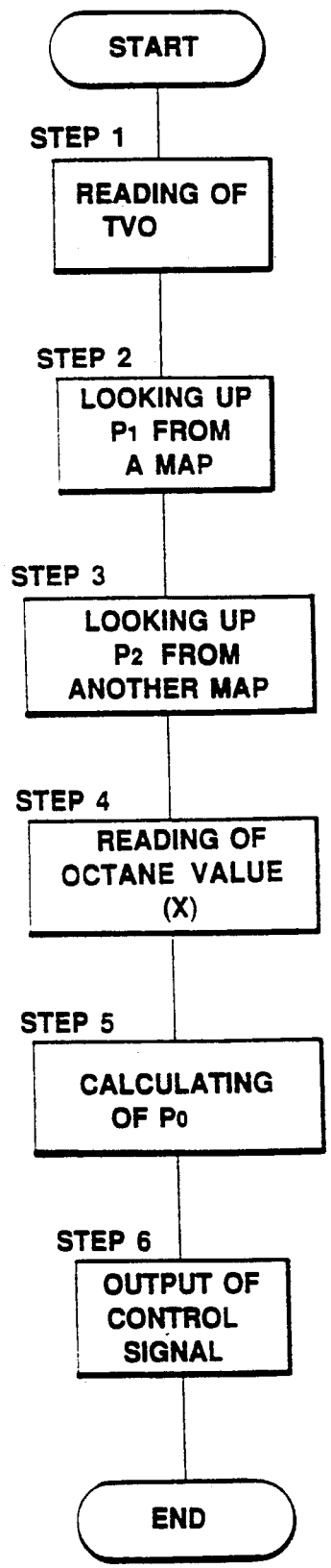
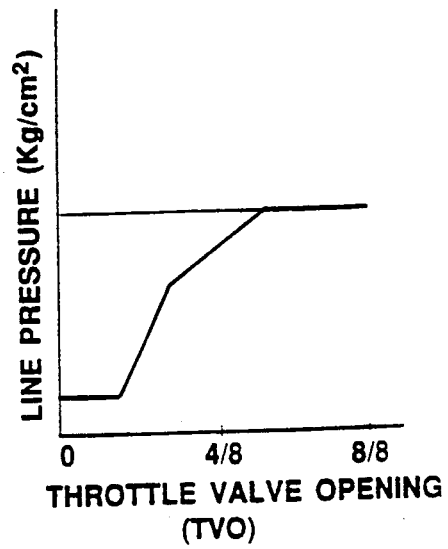
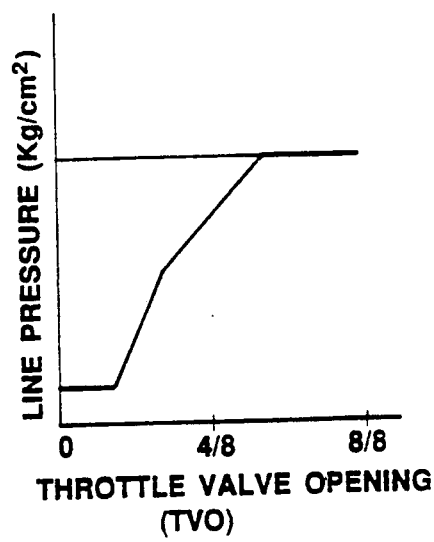

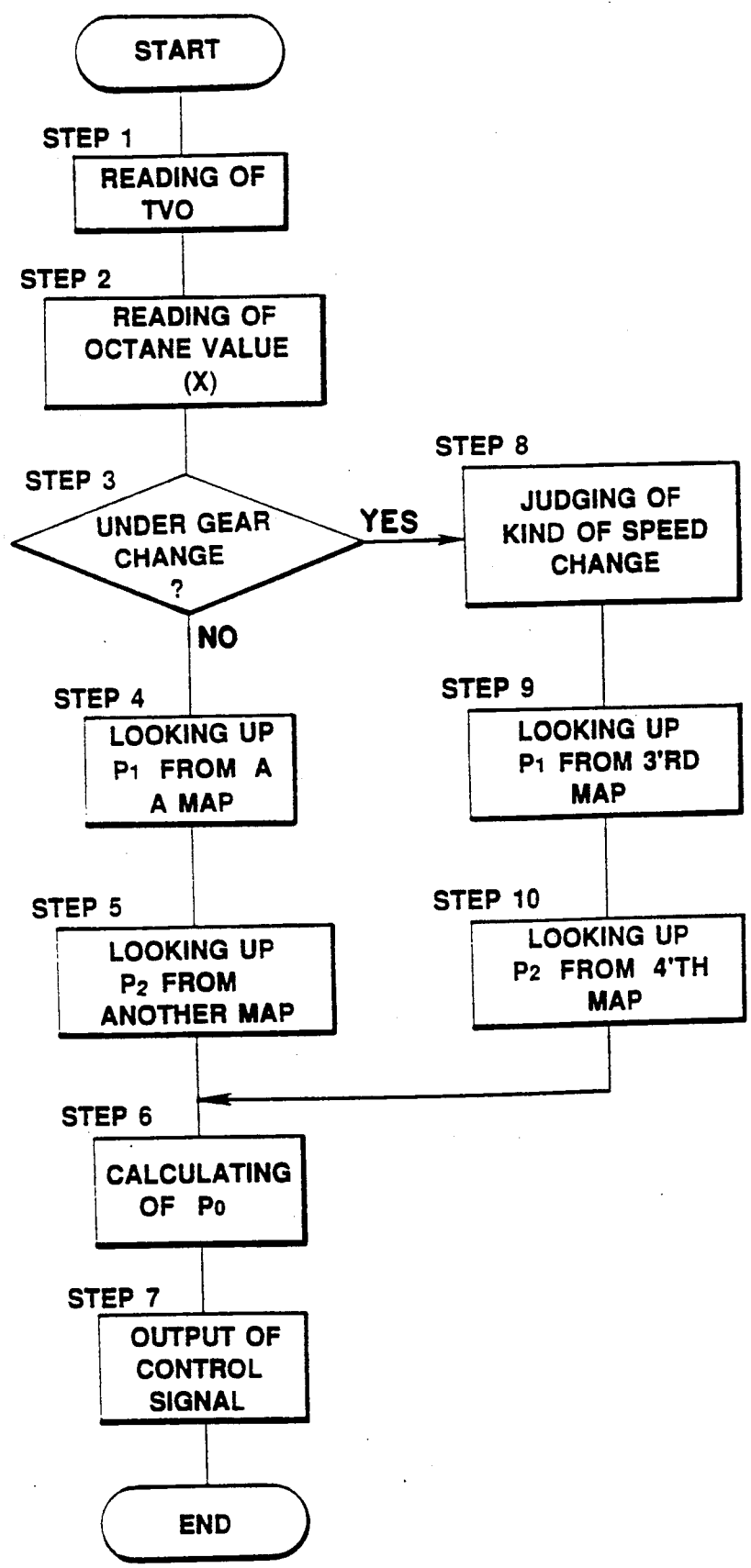

RUNNING STATE ATM
LOW OCTANE GASOLINE

RUNNING STATE ATM
HIGH OCTANE GASOLINE

1'ST SPEED TO 2'ND SPEED
LOW OCTANE GASOLINE

1'ST SPEED TO 2'ND SPEED
HIGH OCTANE GASOLINE

3'RD SPEED TO 4'TH SPEED
LOW OCTANE GASOLINE

3'RD SPEED TO 4'TH SPEED
HIGH OCTANE GASOLINE

_5,050,082_

SYSTEM FOR CONTROLLING AUTOMOTIVE AUTOMATIC TRANSMISSION

BACKGROUND OF THE INVENTION

1. Field of the Invention

The present invention relates in general to control systems for controlling an automotive automatic transmission, and more particularly to control systems of a type which corrects a line pressure of the automatic transmission in accordance with a given factor of fuel supplied to an associated internal combustion engine with which the transmission is incorporated.

2. Background of the Invention

As is known, most of the late automatic transmissions incorporated with an automotive engine are controlled by a mechanically operated hydraulic circuit. Recently, as is shown in JIDOUSHA KOGAKU ZENSHO VOLUME 9 issued from SANKAIDO Co., Ltd on Nov. 20, 1980, some of the automatic transmissions of such type have a computer-aided control unit which assists the control by the hydraulic circuit. In the transmissions of this type, a precise control for gear changes is effected by carrying out ON-OFF operation of a shift solenoid and the line pressure is controlled to a certain value by making a line pressure solenoid carry out a so-called duty ratio operation. That is, by the work of the computer-aided control unit, the target value of the line pressure is derived one after another in accordance with a load applied to the engine, and the duty ratio of the line pressure solenoid is controlled in accordance with the target value.

Accordingly, the clutch operating hydraulic pressure, which is given by reducing the line pressure at a given ratio, is controlled using the load as a parameter. Usually, since the transmission torque of each clutch is known, the clutch operating hydraulic pressure is so determined as to create the optimum value of the transmission torque.

However, the torque generated by the engine differs between two cases, one being a case wherein the engine is operated on low octane gasoline and the other being a case wherein the engine is operated on high octane gasoline. In particular, in conventional control systems, such as the system as disclosed in Japanese Patent First Provisional Publication 58-143169, wherein the ignition timing is controlled in accordance with the octane value of gasoline supplied to the engine, the difference of the torque between the low octane gasoline and the high octane gasoline is very large. This will be easily understood from the graph of FIG. 8.

Accordingly, if high octane gasoline is supplied to an engine whose transmission has the clutch operating hydraulic pressure set up based on low octane gasoline, the torque applied to clutches upon gear change becomes greater than a predetermined desired value causing excessive slippage of the clutches. Of course, this phenomenon shortens the life of the clutches.

On the contrary, if low octane gasoline is supplied to an engine whose transmission has the clutch operating hydraulic pressure set up based on high octane gasoline, the torque applied to the clutch upon gear change becomes lower than the predetermined value causing lack of suitable slippage of the clutches. This phenomenon increases the gear change shock of the transmission.

SUMMARY OF THE INVENTION

It is therefore an object of the present invention to provide a control system of an automotive automatic transmission, which is free of the above-mentioned drawbacks.

According to the present invention, there is provided a control system which corrects the line pressure of the transmission in accordance with the octane value of gasoline used for the associated engine.

According to the present invention, there is provided a system for controlling an automatic transmission with which an automotive engine is incorporated. The system comprises a first control unit which controls an ignition timing of the engine in accordance with an octane value of fuel on which the engine is operated; a second control unit which controls a gear change point of the transmission and controls a line pressure of the transmission in accordance with a given factor of the fuel; and correcting means which corrects the line pressure in accordance with the octane value of the fuel.

BRIEF DESCRIPTION OF THE DRAWINGS

Other objects and advantages of the present invention will become apparent from the following description when taken in conjunction with the accompanying drawings, in which:

FIG. 3 is a flowchart showing steps for controlling the line pressure of the transmission;

FIG. 4 is a graph showing a map from which a line pressure for low octane gasoline is looked up;

FIG. 5 is a graph showing another map from which a line pressure for high octane gasoline is looked up;

FIG. 6 is a flowchart similar to that of FIG. 3, but showing a modification of the control system of the invention;

DETAILED DESCRIPTION OF THE INVENTION

Figure 1:
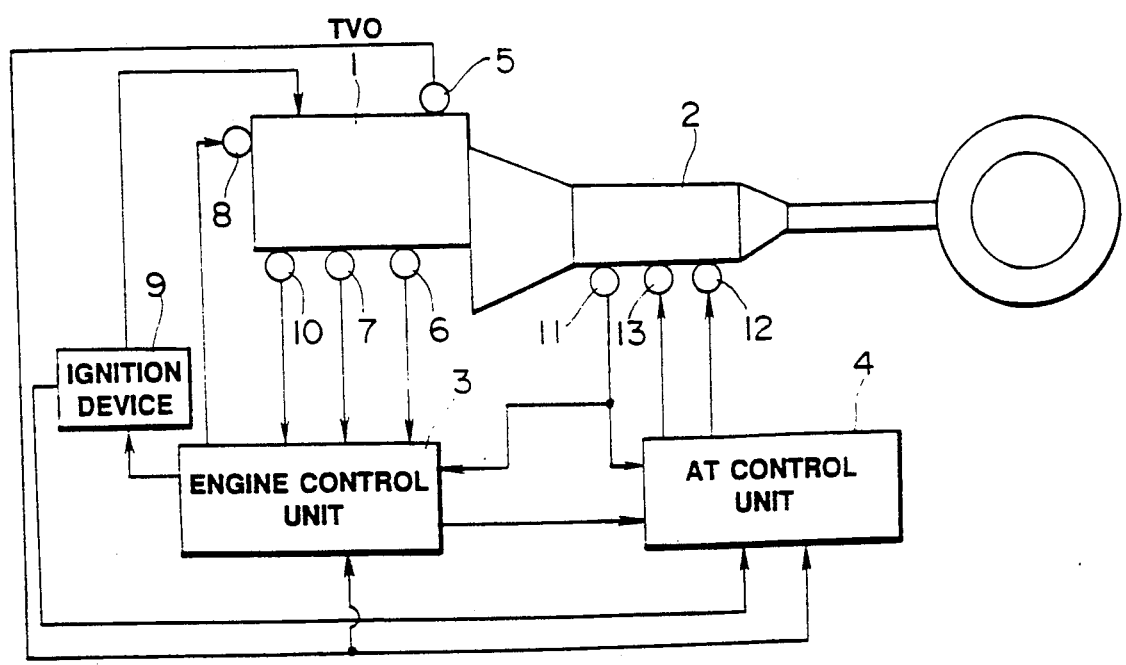
FIG. 1 is a block diagram of a control system for controlling an automotive automatic transmission, according to the present invention.

Reffering to FIG. 1 of the drawings, there is shown a block diagram of a control system according to the present invention.

In the drawing, numeral 1 denotes an internal combustion engine operated on gasoline, and numeral 2 denotes an automatic transmission including a torque converter and a gear train. The engine 1 and the automatic transmission 2 are controlled by an engine control unit 3 and an automatic transmission control unit 4 (which will be referred to as AT control unit hereinafter) respectively. Each unit 3 or 4 includes a digital micro computer.

The engine control unit 3 receives data signals from a throttle valve opening sensor 5, an air flow meter 6, a crankangle sensor 7, a knock sensor 10 and a vehicle speed sensor 11. The unit 3 outputs control signals to fuel injection valves 8 and an ignition timing device 9.

By sensing the ignition timing at which knocking occurs, the octane value of gasoline being used is detected, and the ignition timing of the engine 1 is optimally controlled according to the octane value.

The AT control unit 4 receives data signals from the throttle valve opening sensor 5 and the vehicle speed sensor 11. The unit 4 outputs control signals to a shift solenoid 12 for controlling the gear change point and to a line pressure solenoid 13 carrying out a so-called duty ratio operation for controlling the line pressure. As will be described hereinafter, the AT control unit 4 receives from the engine control unit 3 signals representative of the octane value of the gasoline for correcting the control of the line pressure.

Figure 2:
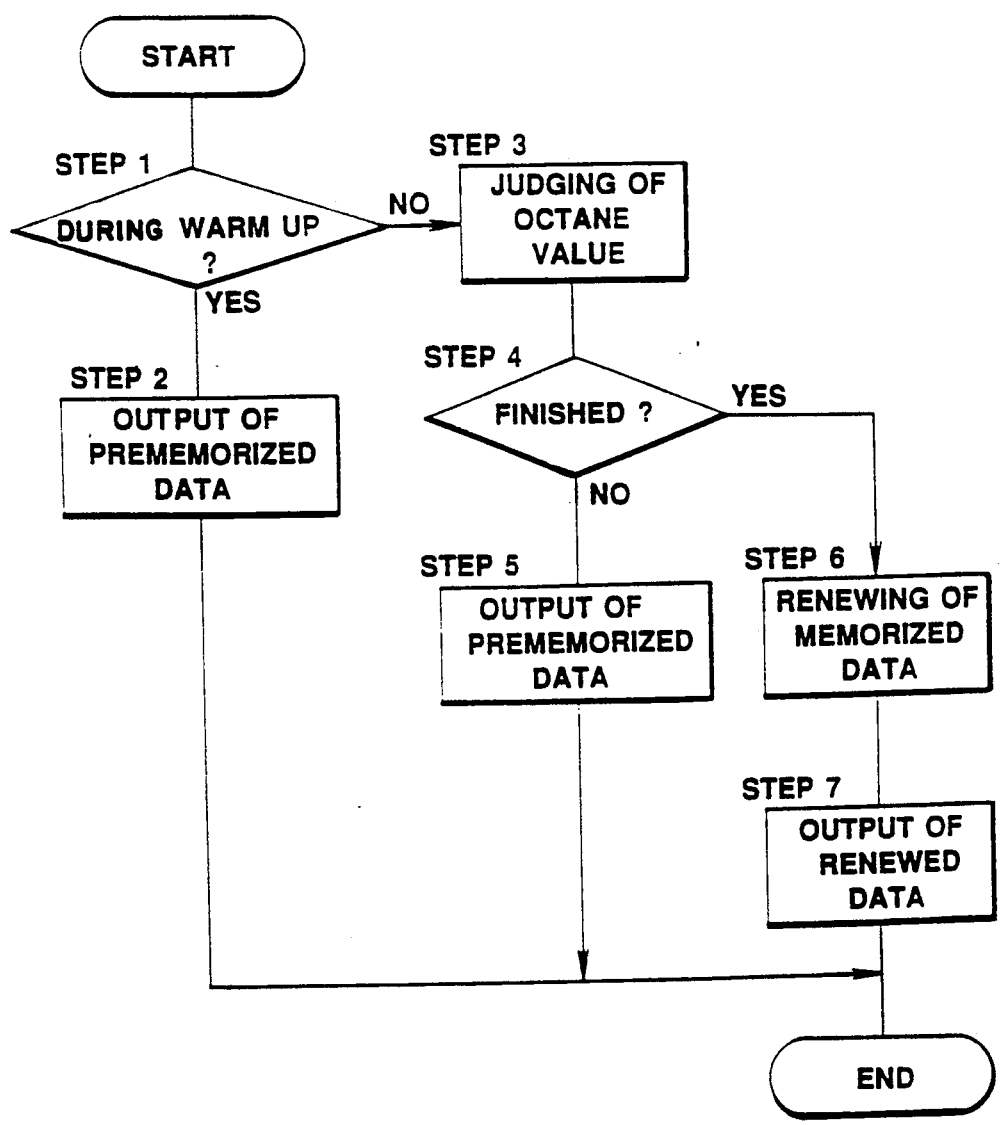
FIG. 2 is a flowchart showing steps for judging the octane value of gasoline practically used for the associated engine.

FIG. 2 shows a flowchart showing the characterizing steps of a program which are run in the computer of the engine control unit 3 for determining the octane value. The derivation of the octane value (step 3) is executed after completion of engine warm up (step 1). That is, during warm up operation and during the time for which the derivation of the octane value is being carried out, prememorized data are outputted (step 2). By enforcedly advancing the ignition timing until knocking occurs, the octane value is determined based upon the advanced timing at which the knocking occurs. The method of determining octane value is described well in U.S. Pat. No. 4,630,584 granted to Kazuhiro HIGASHIYAMA et al. The old octane value memorized is replaced (step 6) with an octane value newly determined and the new octane value is outputted (step 7). If desired, the determining of the octane value may be manually carried out by providing an octane value setting switch. In this case, the switch is manually controlled by a person when gasoline having a different octane value is newly fed to a gasoline tank. That is, upon completion of manipulation of the octane value setting switch, the octane value representing signal is directly fed to both the engine control unit 3 and the AT control unit 4 from the switch.

FIG. 3 is a flowchart showing the characterizing steps of a program which are run in the computer of the AT control unit 4 for controlling the line pressure in accordance with the octane value derived by the engine control unit 3. The line pressure is basically determined by the load of the engine 1, that is, by using a throttle valve opening degree (TVO) of the engine 1 as a parameter. First, the throttle valve opening degree (TVO) is read (step 1) and then a line pressure $P_1$ corresponding to the throttle valve opening degree is looked up from a map for low octane gasoline (step 2). FIG. 4 shows the map for low octane gasoline of octane number 90 in which an optimum line pressure for each throttle valve opening degree (TVO) is plotted. Then, at step 3, a line pressure $P_2$ corresponding to the throttle valve opening degree is looked up from a map for high octane gasoline. FIG. 5 shows the map for high octane gasoline of octane number 100.

At step 4, the octane value signal issued from the engine control unit 3 is read, and at step 5, by using the octane value X thus read and the line pressures $P_1$ and $P_2$ looked up from the respective maps, a target line pressure $P_0$ is calculated using the equation:

$$P_0 = P_1 + \frac{X - 90}{100 - 90}(P_2 - P_1)$$

where:

90 = reference octane value of $P_1$
100 = reference octane value of $P_2$

At step 6, a control signal is fed to the line pressure solenoid 13 in accordance with the target line pressure $P_0$. In concrete terms, the ON-duty ratio of the solenoid 13 is controlled so as to achieve the target value $P_0$ in the line pressure.

That is, when the octane value of gasoline being used is high, the line pressure $P_0$ shows a characteristic similar to that shown in FIG. 5, and thus a relatively high line pressure is provided in the transmission 2. Accordingly, the clutch operating hydraulic pressure in the transmission 2 is kept relatively high thereby suppressing the excessive slippage of the clutches. When, on the contrary, the octane value of gasoline is low, the line pressure $P_0$ shows a characteristic similar to that of FIG. 4, and thus a relatively high line pressure is provided in the transmission. Thus, under this condition, the clutch operating hyraulic pressure is kept relatively low thereby permitting a suitable slippage of the clutches and thus lightening the gear change shock.

FIGS. 6 and 7 show a modification of the control system of the present invention, in which, in addition to the above-mentioned control, the line pressure is further controlled to be suited for running and gear changing conditions of the transmission 2.

Figure 7A:
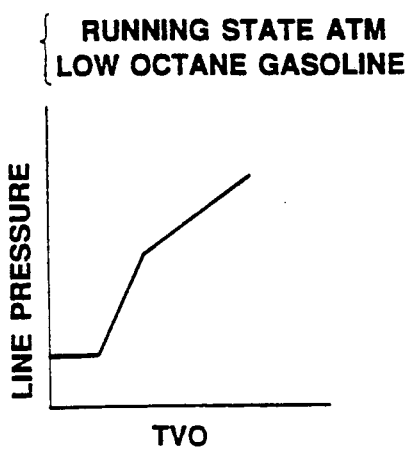
FIGS. 7A to 7F are graphs showing various maps used during execution of the modification of FIG. 6.
Figure 7B:
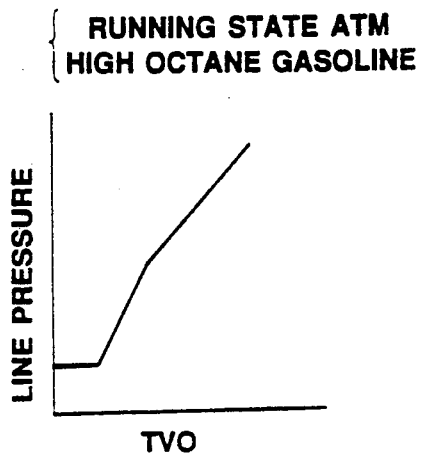

That is, in the running condition wherein the transmission is kept run without gear changing, steps 1 to 7 similar to the above-mentioned steps 1 to 6 of FIG. 3 are executed, so that by using a line pressure $P_1$ looked up from a map for "running-state transmission and low octane gasoline" and a line pressure $P_2$ looked up from another map for "running-state transmission and high octane gasoline", a target line pressure $P_0$ is calculated in a manner as has been described hereinabove. FIGS. 7A and 7B show respectively the maps for the "running-state transmission and low octane gasoline" and the "running-state transmission and high octane gasoline".

Figure 7C:
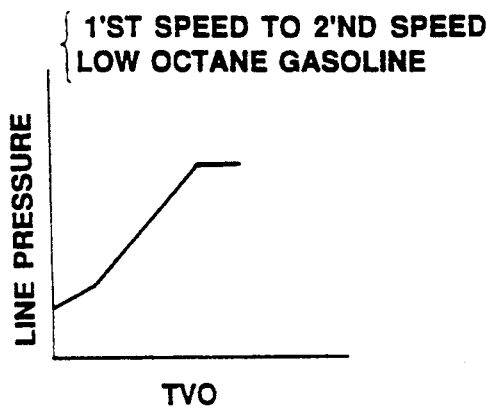
Figure 7D:
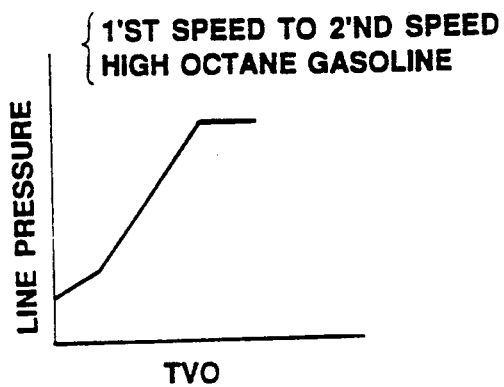
Figure 7E:
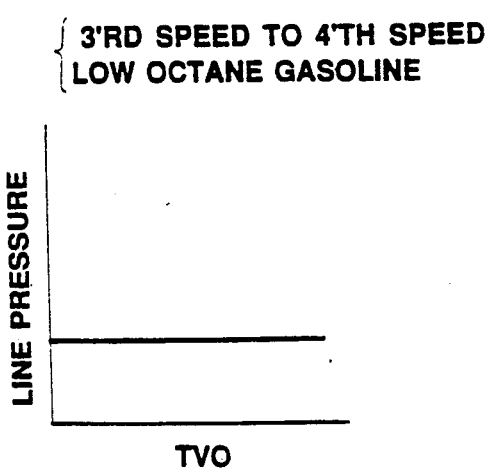
Figure 7F:
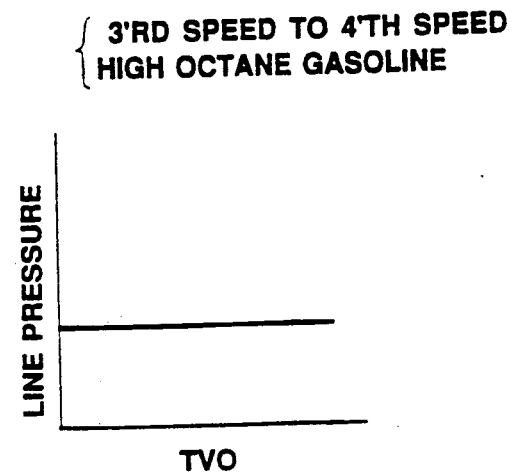
Figure 8:
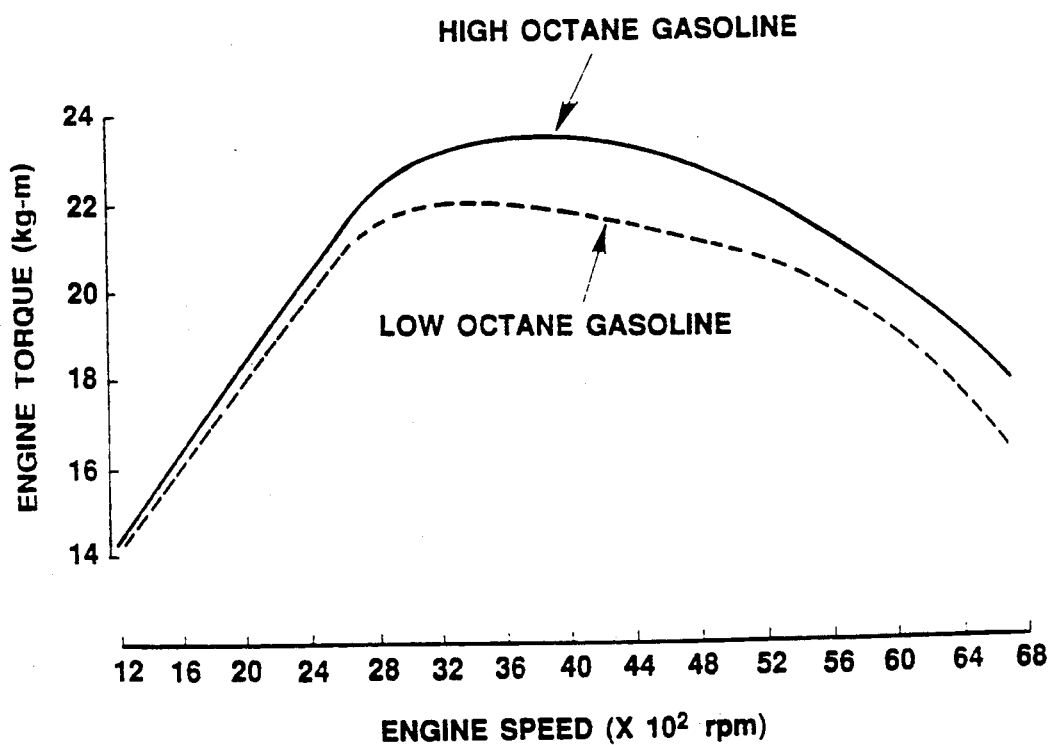
FIG. 8 is graph showing characteristic curves of low and high octane gasoline.

While, when, at step 3, it is judged that the transmission 2 is under gear changing, the kind of the gear change (viz., 1'st speed to 2'nd speed, 2'nd speed to 3'rd speed, etc.,) is determined at step 8. In this modification, respective maps for the low and high octane gasolines are provided for each speed change. At steps 9 and 10, line pressures $P_1$ and $P_2$ are looked up from the maps provided in accordance with the kind of the speed change which is being carried out. At step 6, by using the line pressures $P_1$ and $P_2$ thus looked up and the octane value X read at step 2, a target line pressure $P_0$ is calculated in a manner as has been described hereinabove. FIGS. 7C and 7D show respectively the maps for "1'st speed to 2'nd speed change and low octane gasoline" and "1'st speed to 2'nd speed and high octane gasoline", and FIGS. 7E and 7F show respectively the maps for "3'rd speed to 4'th speed and low octane gasoline" and "3'rd speed to 4'th speed and high octane gasoline".

It will thus be appreciated that steps 4, 5 and 6 provide a first means for changing, or correcting, the target pressure, which is used when the transmission is not undergoing a gear change while steps 8-10 and 6 provide a second means for correcting the target pressure, and that the second means is used when the transmission is undergoing a gear change.

Although, usually, the speed change shock and the effect of the octane value are marked in a speed change of a low gear, the above-mentioned modification can solve or at least minimize the undersired matters by suitably designing the maps.

Although the above-mentioned control systems are directed to an example wherein the target line pressure $P_0$ is changed repeatedly in accordance with the octane value detected, another example may be also employed wherein the judgement of gasoline is so made as to determine only low or high octane gasoline and the target line pressure $P_0$ is determined by looking up either a map for the low octane gasoline or a map for the high octane gasoline.

As will be understood from the foregoing description, in accordance with the control system of the present invention, the line pressure of the automatic transmission is corrected in accordance with the octane value of gasoline being used for the associated engine. That is, when high octane gasoline is used, the clutch operating hydraulic pressure of the transmission is controlled to be relatively high, while, when low octane gasoline is used, the pressure is controlled to be relatively low. Thus, even when the torque of the engine is varied in accordance with the octane value of gasoline, a clutch operating hydraulic pressure suitable for the engine torque is automatically obtained thereby suppressing or at least minimizing the gear change shock of the transmission and the excessive slippage of clutches of the same.

What is claimed is:

1. In a vehicle having an internal combustion engine and an automatic transmission,
    octane value determining means for determining an octane value of fuel on which the engine is operated and means for producing an octane signal responsive thereto;
    a first control unit which produces an ignition control signal in response to the determined octane value thereby to control an ignition timing of the engine responsively to the octane value;
    a second control unit which produces a gear control signal and a line pressure control signal in response to sensed load applied to the engine thereby to control a gear change point of the transmission and a line pressure of the same responsively to a load applied to the engine;
    said second control unit including:
        first correcting means for correcting the line pressure at a first rate in response to said octane signal when the transmission is operating in a single gear; and
        second correcting means for correcting the line pressure at a second rate in response to said octane signal when the transmission is undergoing a gear change,
    each of said first and second correcting means correcting the line pressure by increasing the line pressure as the octane value of the fuel increases.

2. A system as claimed in claim 1, wherein said first control unit includes said octane value determining means and said means for producing said octane signal and wherein said second control unit is connected for receiving said octane signal from said first control unit.

3. A system as claimed 2, in which said first control unit receives data signals from a throttle valve opening degree sensor, an air flow meter, a crank angle sensor and a vehicle speed sensor for determining therefrom data for controlling fuel injectors of the engine and an ignition timing device.

4. A system as claimed in claim 3, in which said first control unit receives a data signal from a knocking sensor which detects the ignition timing at which knocking of the engine occurs, thereby to determine the fuel octane value therefrom and to produce said octane signal.

5. A system as claimed in claim 4, in which said second control unit receives the data signals from said throttle valve opening degree sensor and from said vehicle speed sensor for determining therefrom data for controlling a shaft solenoid and a line pressure solenoid of the transmission.

6. A system as claimed in claim 5, in which said line pressure solenoid is subjected to a duty ratio operation during operation of the transmission.

7. A system as claimed in claim 1, wherein the correction effected by said first and second correcting means is carried out by a sequence of steps, in which:
    a throttle valve opening degree is read;
    a line pressure $P_1$ corresponding to the throttle valve opening degree thus read is looked up from a map for a given low octane gasoline;
    a line pressure $P_2$ corresponding to the throttle valve opening degree thus read is looked up from a map for a given high octane gasoline;
    an octane value X is read corresponding to the octane signal;
    a target line pressure is calculated from the values $P_1$, $P_2$ and X by using a predetermined equation; and
    a control signal is fed to a line pressure solenoid of said transmission in response to the value of said target line pressure.

8. A system as claimed in claim 7, in which said predetermined equation is represented by:

$$P_0 = P_1 + \frac{X - 90}{100 - 90} (P_2 - P_1).$$

9. A system as claimed in claim 8, wherein the correction effected by said second correcting means is carried out in the following steps, in which:
    when it is judged that the transmission is undergoing a gear change, the particular gear change is determined;
    a line pressure $P_1$, corresponding to the particular gear change thus determined, is looked up from a map for a given low octane gasoline;
    a line pressure $P_2$, corresponding to the particular gear change thus determined, is looked up from a map for a given high octane gasoline; and
    the target line pressure is calculated from the values $P_1$, $P_2$, and X by using the predetermined equation.

10. In a vehicle having an internal combustion engine and an automatic transmission,
    octane value determining means for determining an octane value of fuel on which the engine is operated and means for producing an octane signal responsive thereto;
    first control means for producing an ignition control signal in response to the octane value thereby to control ignition timing of the engine responsively to the octane value; and
    second control means for producing a gear control signal and a line pressure control signal in response to sensed load applied to the engine thereby to control a gear change point of the transmission and a line pressure of the same responsively to a load applied to the engine;

said second control means including correcting means for correcting the line pressure at one of first and second rates in response to said octane signal, said correcting means including:
  gear change detecting means for detecting whether or not the transmission is undergoing a gear change, and
  selecting means responsive to said gear change detecting means for selecting said one of said first and second rates depending on whether or not the transmission is undergoing a gear change.

11. A system as claimed in claim 10 wherein said correcting means corrects the line pressure by increasing the line pressure as the octane value of the fuel increases.

* * * * *